United States Patent
Lowe (10) Patent No.: US 12,367,080 B2
(45) Date of Patent: Jul. 22, 2025

(54) SYSTEMS AND METHODS FOR CORRELATING PROBABILITY MODELS WITH NON-HOMOGENOUS TIME DEPENDENCIES TO GENERATE TIME-SPECIFIC DATA PROCESSING PREDICTIONS

(71) Applicant: Capital One Services, LLC, McLean, VA (US)

(72) Inventor: Kevin M. Lowe, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 502 days.

(21) Appl. No.: 17/704,880

(22) Filed: Mar. 25, 2022

(65) Prior Publication Data
US 2023/0305904 A1    Sep. 28, 2023

(51) Int. Cl.
*G06F 9/50* (2006.01)
*G06F 11/34* (2006.01)
*G06F 18/214* (2023.01)
*G06N 20/20* (2019.01)

(52) U.S. Cl.
CPC ............ *G06F 9/5077* (2013.01); *G06F 9/505* (2013.01); *G06F 11/3414* (2013.01); *G06F 18/214* (2023.01); *G06N 20/20* (2019.01)

(58) Field of Classification Search
CPC .... G06F 9/5077; G06F 9/505; G06F 11/3414; G06N 20/20
See application file for complete search history.

(56) References Cited

U.S. PATENT DOCUMENTS

| | | | |
|---|---|---|---|
| 2022/0309295 A1* | 9/2022 | Wang | G06T 7/0012 |
| 2023/0244986 A1* | 8/2023 | Clifford | G06N 3/0985 |
| | | | 706/12 |

* cited by examiner

Primary Examiner — Hau H Hoang
(74) Attorney, Agent, or Firm — Foley & Lardner LLP (57) ABSTRACT

Methods and systems use an additional determination to generate predictions of future data processing load predictions. Specifically, the methods and systems generate additional predictions based on other data sets and data calculation methodologies (e.g., data with non-homogeneous time dependencies). The methods and systems then use these additional predictions to determine whether or not the prediction of the real-time average of data processing loads is an outlier. Thus, the methods and systems generate a time-specific data processing prediction.

20 Claims, 5 Drawing Sheets

SYSTEMS AND METHODS FOR CORRELATING PROBABILITY MODELS WITH NON-HOMOGENOUS TIME DEPENDENCIES TO GENERATE TIME-SPECIFIC DATA PROCESSING PREDICTIONS

BACKGROUND

In recent years, the use of artificial intelligence, including but not limited to machine learning, deep learning, etc. (referred to collectively herein as artificial intelligence) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results as well as improving the models providing the results. These technical problems present an inherent problem with attempting to use an artificial intelligence-based solution in data processing load predictions.

SUMMARY

In view of the aforementioned problems, methods and systems are described herein for novel uses and/or improvements to generating data processing load predictions. For example, with the advent of cloud computing, and in particular cloud-based resources, the amount and types of data processed has been exponentially increasing. In many cases, proper management of the data processing load on a network is key to ensuring the efficient use of resources as well as maintaining a high level of data processing throughput. That is, a properly managed network may comprise a network with efficiently balanced domain loads that ensures that each domain is capable of handling its assigned data processing load. A key factor in properly managing a network is predicting a data processing load at any given time. For example, if a prediction indicates that a data processing load will be high at a given time, adequate resources may be allocated to handle the load.

However, predicting a data processing load at any given time is difficult as a load attributed to any entity may be based on numerous variables and each of these entities may have unique variables. The amount and seemingly random nature of these variables creates an inherent problem in predicting data processing load at any given time. In view of this problem, the methods and systems described herein provide the novel uses and/or improvements to generating data processing predictions using artificial intelligence. For example, the methods and systems described herein use artificial intelligence to find patterns in the numerous and seemingly random number of variables of historic data processing data in order to generate predictions of future data processing load predictions.

However, as opposed to conventional systems that would attempt to aggregate as much data as possible on a given network and generate a prediction based on that data, the methods and systems instead attempt to determine whether or not a given prediction is reliable. For example, the most reliable prediction is typically based on a real-time average of data processing loads. That is, the immediately preceding state of a network is typically the best indicator of the current state of the network. Nonetheless, the use of real-time average of data processing loads can be determinantal as predictions based on the real-time average of data processing loads can be subject to large spikes and other random outlier effects.

As such, the methods and systems use an additional determination to generate predictions of future data processing load predictions. Specifically, the methods and systems generate additional predictions based on other data sets and data calculation methodologies (e.g., data with non-homogeneous time dependencies). The methods and systems then use these additional predictions to determine whether or not the prediction of the real-time average of data processing loads is an outlier. By performing this additional step (and generating the additional predictions), the methods and systems determine whether or not the prediction based on the real-time average of data processing loads is likely to be an outlier. If the system determines that it is not an outlier, the system may generate a recommendation based on the real-time average of data processing loads (e.g., allocate network resources based on the real-time average of data processing loads). If the system determines that it is an outlier, the system may generate a recommendation based on the additional predictions (e.g., allocate network resources based on other data calculation methodologies). Thus, the methods and systems generate a time-specific data processing prediction.

Furthermore, to determine whether or not the real-time average of data processing loads is an outlier, the system does not use conventional methodologies for comparing data (e.g., variance thresholds, comparing an average) but instead uses an additional machine learning model to determine how well the various predictions are correlated. For example, the methods and systems may determine an aggregate measure of correlation for the first machine learning model, the second machine learning model, and the third machine learning model. The system may determine the aggregate measure of correlation based on a parametric test that determines use parameters such as True Positive Rate (TPR) and False Positive Rate (FPR). For example, TPR is the probability that an actual positive will test positive. FPR is the probability that an actual negative will test positive. By using the aggregate measure of correlation as opposed to simply comparing the predicted outputs against each other (or triggering a response based on the detected outlier alone), the methods and systems do not introduce a prediction bias into the determination. For example, a prediction bias could negate a detected spike in data processing load that is not a false-positive and thus cause a network failure when a properly managed network is needed most.

In some aspects, methods and systems for generating dynamic database query responses using ensemble prediction by correlating probability models with non-homogeneous time dependencies to generate time-specific data processing predictions are described. The system may receive a first portion of a time series data feed for a first machine learning model, wherein the first portion of the time series data feed comprises a first data processing load prediction based on a real-time average of data processing loads from a first plurality of data sources. The system may receive a second portion of the time series data feed for a second machine learning model. The system may receive a third portion of the time series data feed for a third machine learning model. The system may determine a first feature input for the first machine learning model based on the first portion, a second feature input for the second machine learning model based on the second portion, and a third feature input for the third machine learning model based on the third portion. The system may input the first feature input into the first machine learning model, the second feature input into the second machine learning model, and the third feature input into the third machine learning model to generate a first output from the first machine learning model, a second output from the second machine learning model, and a third output from the third machine learning model. The system may compare the first output to the second output and the third output to detect an outlier result in the first output. The system may, in response to detecting the outlier result, input the first output, the second output, and the third output into a fourth machine learning model to generate a fourth output. The system may determine, based on the fourth output, an aggregate measure of correlation for the first machine learning model, the second machine learning model, and the third machine learning model. The system may generate a dynamic database query response based on the aggregate measure of correlation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
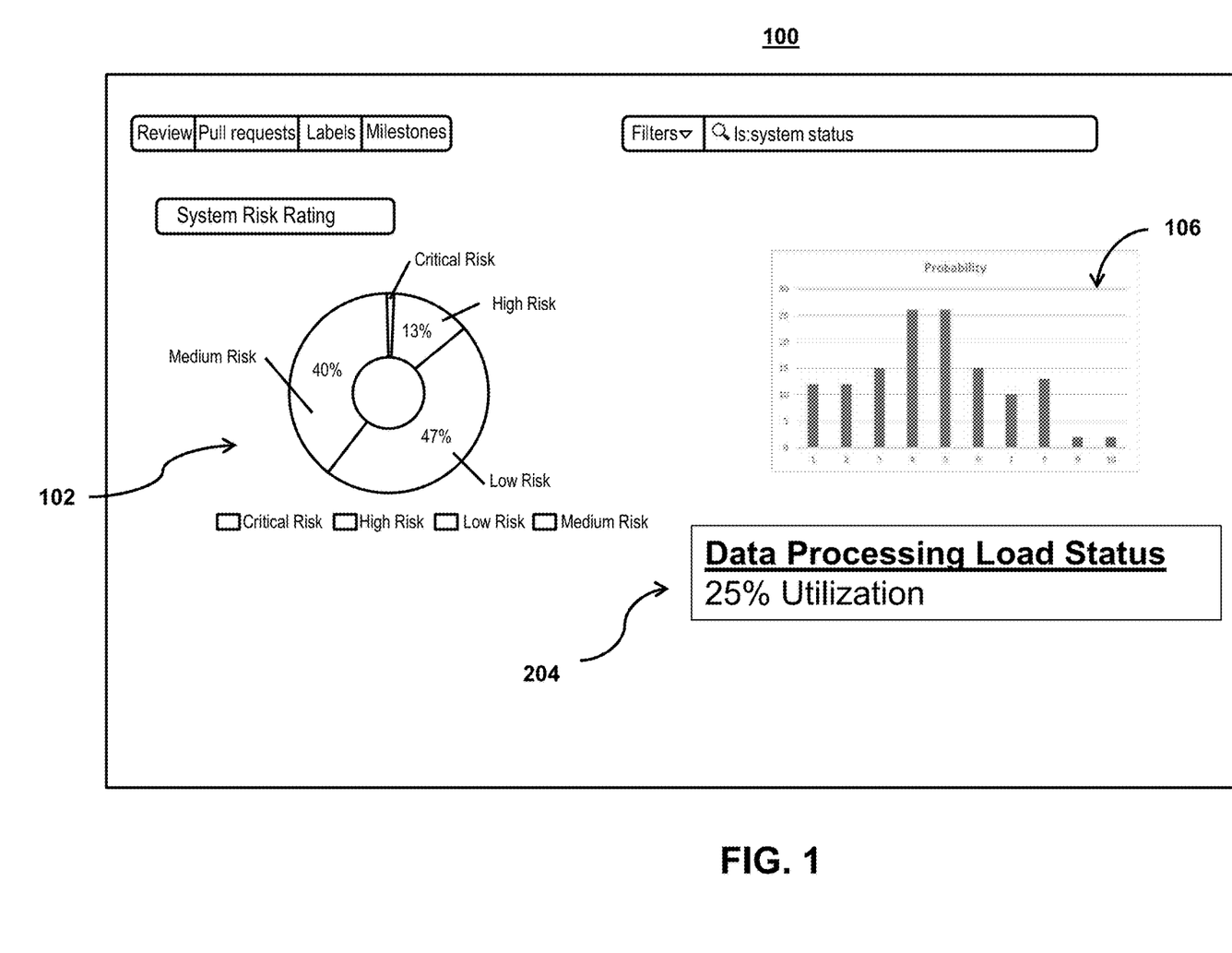
FIG. 1 shows an illustrative user interface for generating dynamic database query responses, in accordance with one or more embodiments.

FIG. 1 shows an illustrative user interface for generating dynamic database query responses, in accordance with one or more embodiments. For example, user interface 100 may represent a recommendation for data processing load predictions. For example, graph 102 and graph 106 may include graphical representations of a probability that a future data processing load may exceed current resource allocations. In another example, icon 104 may represent a textual description of a probability that a current or future data processing load may be classified into a given state. In some embodiments, user interface 100 may appear on one of the devices shown in FIG. 4 below.

For example, in some embodiments, the system may receive multi-modal data. The multi-modal data may comprise data from a plurality of sources. For example, the data may comprise data from numerous different network domains and/or network resources. In some embodiments, the data may comprise state data that describes a current state of a domain and/or resource. The state may indicate a current amount of data processing load for a domain and/or resource.

In some embodiments, the data may comprise financial data from a plurality of sources. For example, the system may utilize data mining to extract patterns among multiple overnight rates, and having distilled these patterns, assign weights for a given event category (e.g., weather, tax policy, rate change, inflation, etc.) based on correlated impact. Based on the patterns and weighting, the system may train a machine learning model. The system may then use a CBOE ("Chicago Board Options Exchange") Volatility Index ("VIX") as a data stream and detect additional patterns among event triggers and outcomes. The resulting volatility-based forecasting model is used by the system to predict overnight rate forecast.

The system may compare trends, historical spikes, and correlations across these indexes (e.g., the London Interbank Offer Rate (LIBOR) to the Secured Overnight Financing Rate (SOFR)). The VIX data may be used to find patterns, but also provide a real-time indication of volatility, which can improve overnight rate forecasting.

For example, the system may use the VIX data to generate a first data processing load prediction based on a real-time average of data processing loads (e.g., values) from a first plurality of data sources. For example, the VIX data may comprise a midpoint of real-time S&P 500 Index (SPX) data. Nonetheless, the use of real-time average of data processing loads (e.g., VIX data) can be determinantal as predictions based on the real-time average of data processing loads can be subject to large spikes and other random outlier effects. As such, the methods and systems use an additional determination to generate predictions of future data processing load predictions. Specifically, the methods and systems generate additional predictions based on other data sets and data calculation methodologies (e.g., data with non-homogeneous time dependencies). For example, the system may use data based on LIBOR data, which uses a waterfall approach featuring a progressively calculated weighted average of data processing loads (e.g., values) from a second plurality of data sources. The system may also use SOFR, which uses compounded averages of the SOFR over rolling 30-, 90-, and 180-calendar day periods). Notably, as the system is trained and calibrated against the above indexes, additional data can be added and trained from other overnight benchmarks.

For example, to classify a portion of a time series data feed, the system uses transition probability matrices to forecast the probability of processing loads at a point (e.g., a future date). For example, for the probability of moving from state i to state j, the transition probability matrix P is given by using Pij as the ith row and jth column element for finite state space Σ with cardinality S.

The distribution over states may be written as a probability distribution vector x(t) of length S at time t to forecast the future state distribution of x(t) n statements in advance. For example, the model outlines the relation that is the conditional probability distribution of future states of the process which depends only upon the present state, and not on the sequence of events that preceded it.

Figure 2:
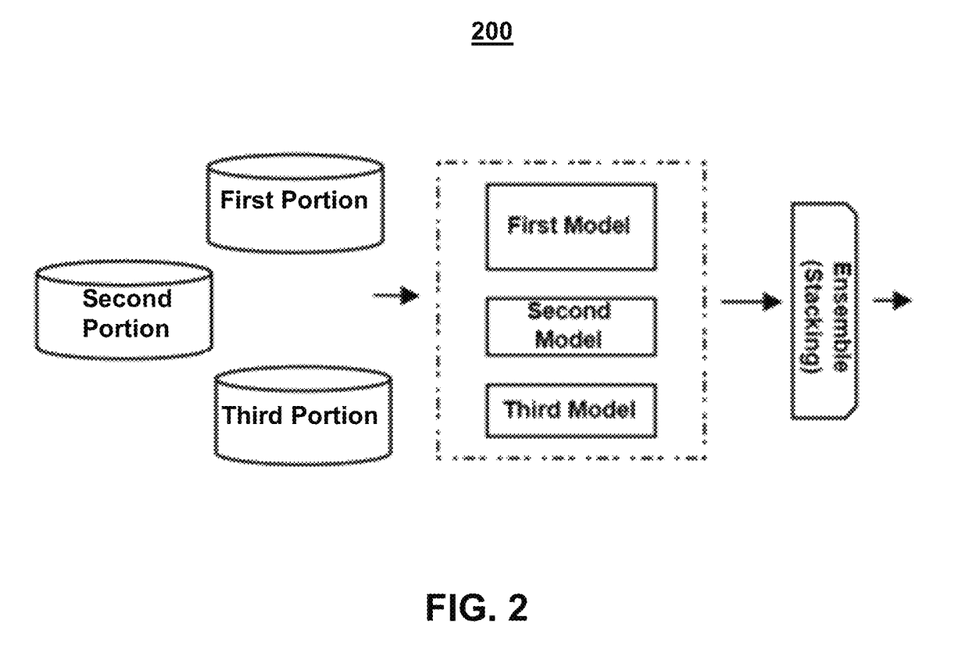
FIG. 2 shows an illustrative system architecture for generating dynamic database query responses, in accordance with one or more embodiments.

FIG. 2 shows an illustrative system architecture for generating dynamic interface options using machine learning models featuring multi-modal feature inputs in accordance with one or more embodiments. For example, FIG. 2 includes system 200. System 200 comprises an ensemble of artificial intelligence models.

For example, as shown in system 200, inputs (e.g., a first portion of multi-modal data from a first plurality of data sources, a second portion of multi-modal data from a second plurality of data sources, and a third portion of multi-modal data from a third plurality of data sources) may be inputted into a plurality of machine learning models (e.g., a first machine learning model, a second machine learning model, and a third machine learning model). The ensemble function may combine the outputs from multiple base models (e.g., a first machine learning model, a second machine learning model, and a third machine learning model) into a single score. For example, outputs from base-level models may be used as input features which may be used to train the ensemble function. In some embodiments, the ensemble function may be a linear combination of the base model scores.

Each of the base-level models may use independent data and/or modeling algorithms to generate predictions. For example, a first machine learning model may receive data and generate a real-time average (or a prediction of) of inputted data. For example, a real-time average or a moving average (rolling average or running average) is a calculation to analyze data points by creating a series of averages of different subsets of the full data set. For example, a simple moving average (SMA) of p data points is the unweighted mean of the previous k data-points over a dataset containing n entries. In some embodiments, the mean is normally taken from an equal number of data on either side of a central value. This ensures that variations in the mean are aligned with the variations in the data rather than being shifted in time. The simple moving average may thus be calculated as:

$$SMA_k = \frac{p_{n-k+1} + p_{n-k+2} \ldots + p_n}{k}$$

$$= \frac{1}{k} \sum_{i=n-k+1}^{n} p_i$$

For example, a second machine learning model may receive data and progressively calculate a weighted average of (or a prediction of) the inputted data. That is, data that is received first may be more highly weighted than data that is received later. In financial data embodiments, the progressively calculated weighted average may comprise a waterfall methodology. For example, in financial systems, the waterfall methodology is comprised of three levels: Level 1 Transaction-Based, Level 2 Transaction-Derived, and Level 3 Expert Judgment. The aim is to obtain as many Level 1 submissions from sources as possible, since Level 1 submissions are based on a weighted average price of eligible transactions, while a Level 3 submission is least preferable.

In yet another example, a third machine learning model may receive data and calculate a compounded average over a rolling time window of data. For example, the system may calculate a compounded average over varying windows of time.

The system may then use the various machine learning models to generate outputs (e.g., predictions of a data processing load). The system may compare the outputs to determine if one of the outputs is an outlier. For example, outliers in time series data are values that significantly differ from the patterns and trends of the other values in the time series.

The system may detect multiple types of outliers (e.g., an outlier result). For example, the system may detect global outliers whose raw values are significantly larger or smaller than the rest of the values. The values do not need to be among the largest or smallest in the time series to be declared outliers. Instead, some outliers are identified by the system based on context, by having a significantly higher or lower value than the system expects based on the patterns and trends of the time series (or values of the other outputs).

For example, the system may use a time series with T fitted time steps, the system then proceeds based on a maximum number of outliers i that may range from 1 to the maximum number of outliers. The system then calculates the residuals of each time step t by subtracting the value of the forecasted model output from the raw value:

$$r_t = x_t - \text{Forecast}(x_t)$$

The system may then calculate the mean and standard deviation of the residuals, and the system may calculate the test statistic by dividing the maximum absolute deviation from the mean by the standard deviation:

$$R_i = \frac{\max|r_t - \bar{r}|}{\sigma_r}$$

The system then compares the test statistic to the following critical value:

$$T_i = \frac{(T-i) \cdot t_{\alpha, T-i-1}}{\sqrt{(T-i-1+t^2_{\alpha, T-i-1}) \cdot (T-i+1)}}$$

where $t_\alpha$, T–i–1 is the two-sided critical value of the t-distribution with T–i+1 degrees of freedom at confidence level $(1-\alpha/(2(T-i+1)))$ and $\alpha$ is the significance level (determined by the confidence level).

If the test statistic is larger than the critical value, the test for exactly i outliers is statistically significant. The system may then remove the value associated with the maximum absolute residual, and iterate through the steps on all time steps that have not been previously removed, also increasing i by one. The mean and standard deviation of the residuals change by removing the value at each repetition. This recalculation of the mean and standard deviation corrects for the influence of the outliers on the forecast model. The system then detects the outliers associated with the largest number of outliers that were statistically significant.

In response to detecting an outlier, the system may then determine whether or not the models are correlated. For example, the system may determine various qualitative and/or quantitative metrics for determining an aggregated measure of correlation. For example, the system may use Pearson Correlation, Time Lagged Cross Correlation (TLCC) & Windowed TLCC, Dynamic Time Warping (DTW), and/or Instantaneous phase synchrony.

Adding strong, complementary models to the ensemble improves correlation. For example, the complementary models have a higher area under the curve (AUC) percentage in a receiver operating characteristic (ROC) curve. The ROC curve is a graph showing the correlation of a classification model at all classification thresholds. This curve plots two parameters: TPR and FPR. For example, TPR is the probability that an actual positive will test positive. FPR the probability that an actual negative will test positive. For example, an ROC curve plots TPR vs. FPR at different classification thresholds. Lowering the classification threshold classifies more items as positive, thus increasing both False Positives and True Positives. The AUC measures the entire two-dimensional area underneath the entire ROC curve from (0,0) to (1,1). AUC provides an aggregate measure of correlation. One way of interpreting AUC is as the probability that the model ranks a random positive example more highly than a random negative example.

In some embodiments, the system may determine an aggregate measure of correlation for the base models and the ensemble model. The system may do this at any time point and may determine the correlation in response to a detected outlier. The system may also select which model is used to generate dynamic database query responses based on the AUC (e.g., the aggregate measure of correlation). For example, the system may use the output of the ensemble function or one of the base models based on the highest AUC. The system may also use the respective AUC of the base models to determine if a base model should be used to generate inputs into the ensemble function (e.g., to determine whether or not the model is correlated). For example, the system may use a low AUC attributed with a machine learning model to compare it with another machine learning model.

Figure 3:
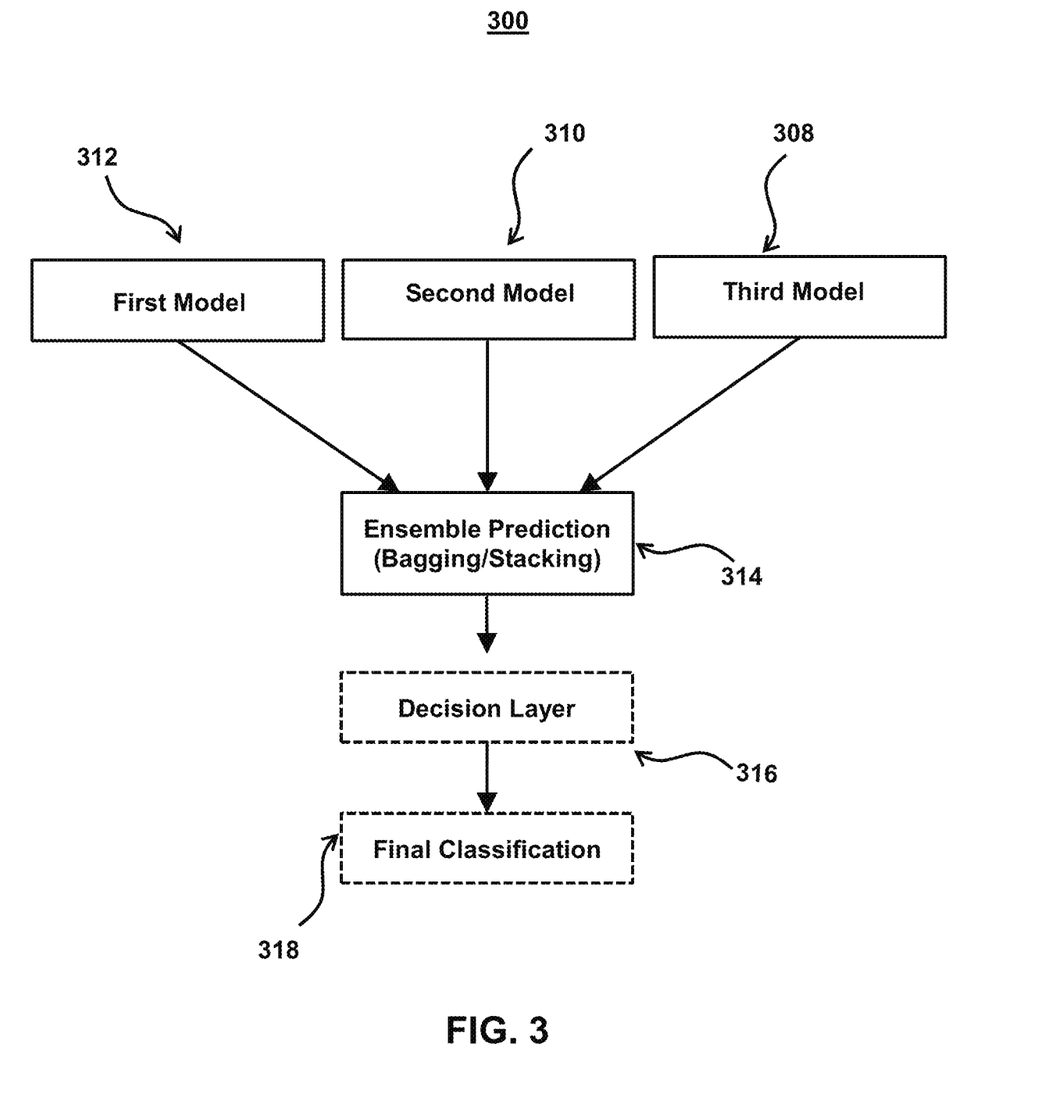
FIG. 3 shows an illustrative model architecture for generating dynamic database query responses, in accordance with one or more embodiments.

FIG. 3 shows an illustrative model architecture for generating dynamic database query responses, in accordance with one or more embodiments. System 300 may receive time series data feed data based on time series data feeds with user interfaces (e.g., user interface 100 (FIG. 1)) during a device session. The time series data feed data (e.g., data 304) may include metadata, which may be metadata related to time series data. Metadata may include data values (e.g., stock prices), pageview information, and text path and page structure data. For example, a pageview (or pageview hit, page tracking hit) may be an instance of a page being loaded (or reloaded) in a browser. Text path information may indicate lines, shapes, and/or graphic elements that text follows. Metadata may also include information on how the application and/or the website is set up, i.e., how the individual subpages are linked to one another. The system may generate data 304 using image recognition and/or object recognition. For example, the system may determine a first user interface image corresponding to the first time series data feed in the user interface. For example, the system may capture user interface image data such as an image of a current user interface (and/or menus or features being accessed). The system may then apply computer vision techniques to determine metadata or a vector array corresponding to the image. For example, the system may employ computer vision tasks that include acquiring, processing, analyzing, and understanding digital images, and extraction of high-dimensional data from the real world in order to produce numerical or symbolic information, e.g., in the forms of decisions. To understand the context of the image, the system may transform visual images into descriptions of data.

System 300 may also use transfer learning. For example, transfer learning allows system 300 to deal with current scenarios (e.g., detecting data processing load) by leveraging the already existing labeled data of some related task or domain. System 300 may store knowledge gained through other tasks and apply it to the current task.

System 300 may then proceed to process this information (or a portion of this information) in first model 310, second model 312, and/or third model 308. The models may include a softmax function or a normalized exponential function. The softmax function takes as input a vector z of K real numbers, and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities.

First model 310, second model 312, and third model 308 may receive inputs and generate outputs that are processed by fourth model 314. Fourth model 314 may then generate a final classification 318. Fourth model 314 may include ensemble prediction. For example, ensemble methods use multiple learning algorithms to obtain better predictive correlation than could be obtained from any of the constituent learning algorithms alone. Unlike a statistical ensemble in statistical mechanics, which is usually infinite, a machine learning ensemble consists of only a concrete finite set of alternative models, but typically allows for much more flexible structure to exist among those alternatives. Additionally, the fourth model 314 may include bootstrap aggregating and stacking.

Bootstrap aggregating, often abbreviated as bagging, involves having each model in the ensemble vote with equal weight. In order to promote model variance, fourth model 314 trains each model in the ensemble using a randomly drawn subset of the training set. As an example, the random forest algorithm combines random decision trees with bagging to achieve very high classification accuracy. In bagging, the samples are generated in such a way that the samples are different from each other; however, replacement is allowed. Stacking (sometimes called stacked generalization) involves training a learning algorithm to combine the predictions of several other learning algorithms. First, all of the other algorithms are trained using the available data, then a combiner algorithm is trained to make a final prediction using all the predictions of the other algorithms as additional inputs. If an arbitrary combiner algorithm is used, then stacking can theoretically represent any of the ensemble techniques described in this article, although, in practice, a logistic regression model is often used as the combiner. Stacking typically yields better correlation than any single one of the trained models. It should be noted that in some embodiments, first model 310, second model 312, third model 308, and fourth model 314 may be combined into or more models (e.g., may comprise a single model).

The output of fourth model 314 may then be input into decision layer 316. At decision layer 316, system 300 may rank potential responses (e.g., potential data processing loads) by probability, and select a number (e.g., a predetermined number of responses and/or all responses with a probability greater than a given threshold). In some embodiments, decision layer 316 may determine an aggregate measure of correlation for the first machine learning model, the second machine learning model, the third machine learning model, and/or the fourth machine learning model. At decision layer 316, system 300 may determine the machine learning model with the highest aggregate measure of correlation. In response to determining the machine learning model with the highest aggregate measure of correlation, system 300 may use a given model output (e.g., a model that uses real-time averages) for generating a dynamic database query response from a plurality of dynamic database query responses.

Figure 4:
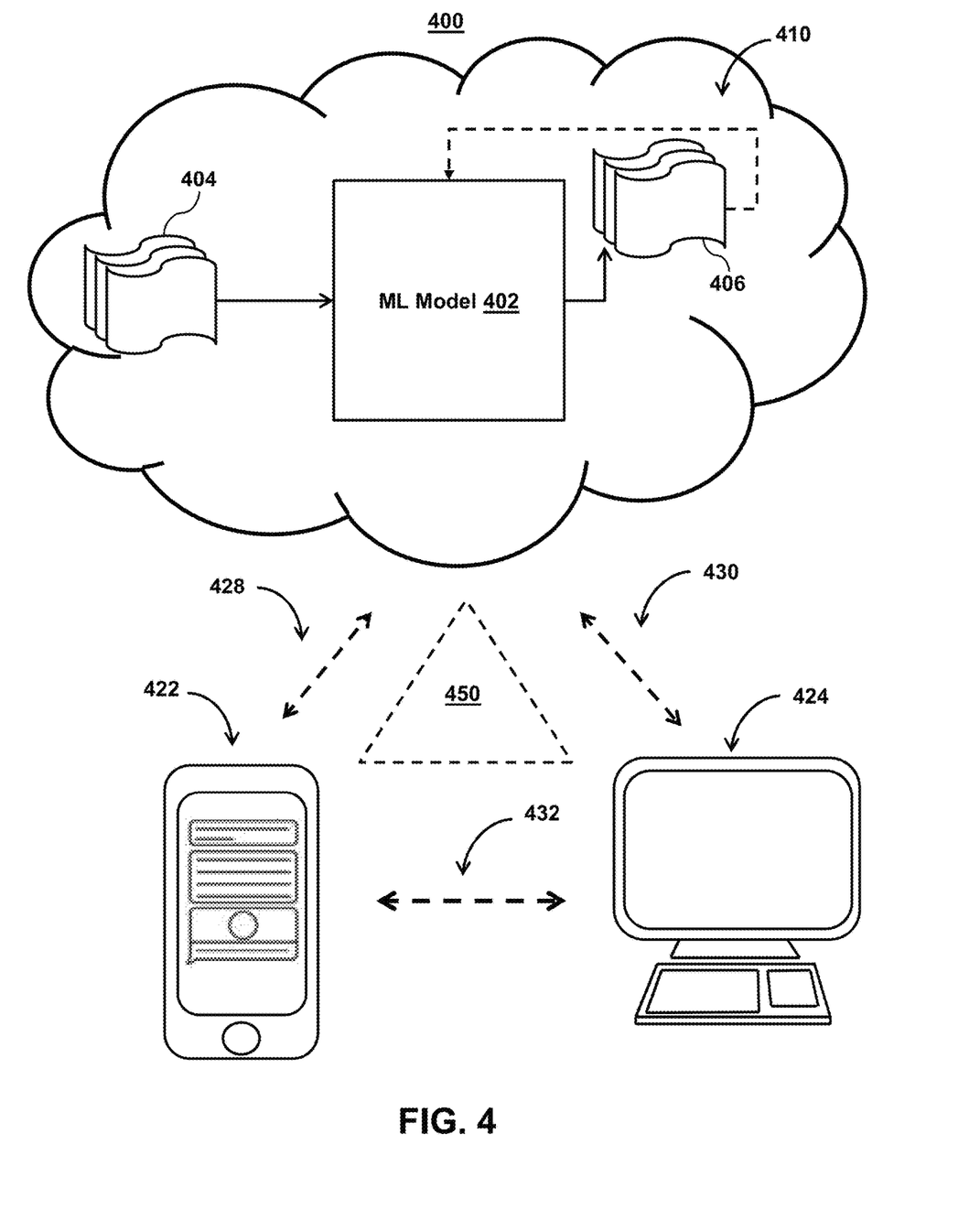
FIG. 4 is an illustrative system for generating dynamic database query responses, in accordance with one or more embodiments.

FIG. 4 is an illustrative system for generating dynamic database query responses, in accordance with one or more embodiments. For example, system 400 may represent the components used for generating dynamic interface options as shown in FIG. 1. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., based on recommended contact strategies).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating dynamic database query responses using ensemble prediction by correlating probability models with non-homogeneous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior transactions. Alternatively, or additionally, the system may act as a clearing house for multiple sources of information about the user. Cloud components 410 may also include control circuitry configured to perform the various operations needed to generate recommendations.

Cloud components 410 include machine learning model 402. Machine learning model 402 may take inputs 404 and provide outputs 406. The inputs may include multiple datasets such as a training dataset and a test dataset. Each of the plurality of datasets (e.g., inputs 404) may include data subsets related to user data, contact strategies, and results. In some embodiments, outputs 406 may be fed back to machine learning model 402 as input to train machine learning model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In another embodiment, machine learning model 402 may update its configurations (e.g., weights, biases, or other parameters) based on the assessment of its prediction (e.g., outputs 406) and reference feedback information (e.g., user indication of accuracy, reference labels, or other information). In another embodiment, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

In some embodiments, machine learning model 402 may include an artificial neural network (e.g., as described in FIG. 5 below). In such embodiments, machine learning model 402 may include an input layer and one or more hidden layers. Each neural unit of machine learning model 402 may be connected with many other neural units of machine learning model 402. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Machine learning model 402 may be self-learning and trained, rather than explicitly programmed, and can perform significantly better in certain areas of problem solving, as compared to traditional computer programs. During training, an output layer of machine learning model 402 may correspond to a classification of machine learning model 402 and an input known to correspond to that classification may be input into an input layer of machine learning model 402. During testing, an input without a known classification may be input into the input layer, and a determined classification may be output.

In some embodiments, machine learning model 402 may include multiple layers (e.g., where a signal path traverses from front layers to back layers). In some embodiments, back propagation techniques may be utilized by machine learning model 402 where forward stimulation is used to reset weights on the "front" neural units. In some embodiments, stimulation and inhibition for machine learning model 402 may be more free-flowing, with connections interacting in a more chaotic and complex fashion. During testing, an output layer of machine learning model 402 may indicate whether or not a given input corresponds to a classification of machine learning model 402.

System 400 also includes API layer 450. API layer 450 may allow the system to generate recommendations across different devices. In some embodiments, API layer 450 may be implemented on mobile device 422 or user terminal 424. Alternatively or additionally, API layer 450 may reside on one or more of cloud components 410. API layer 450 (which may be a REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 450 may use various architectural arrangements. For example, system 300 may be partially based on API layer 450, such that there is strong adoption of SOAP and RESTful Web services, using resources like Service Repository and Developer Portal, but with low governance, standardization, and separation of concerns. Alternatively, system 300 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open-source API platforms and their modules. API layer 450 may use Developer Portal. API layer 450 may use strong security constraints applying WAF and DDoS protection, and API layer 450 may use RESTful APIs as standard for external integration.

Figure 5:
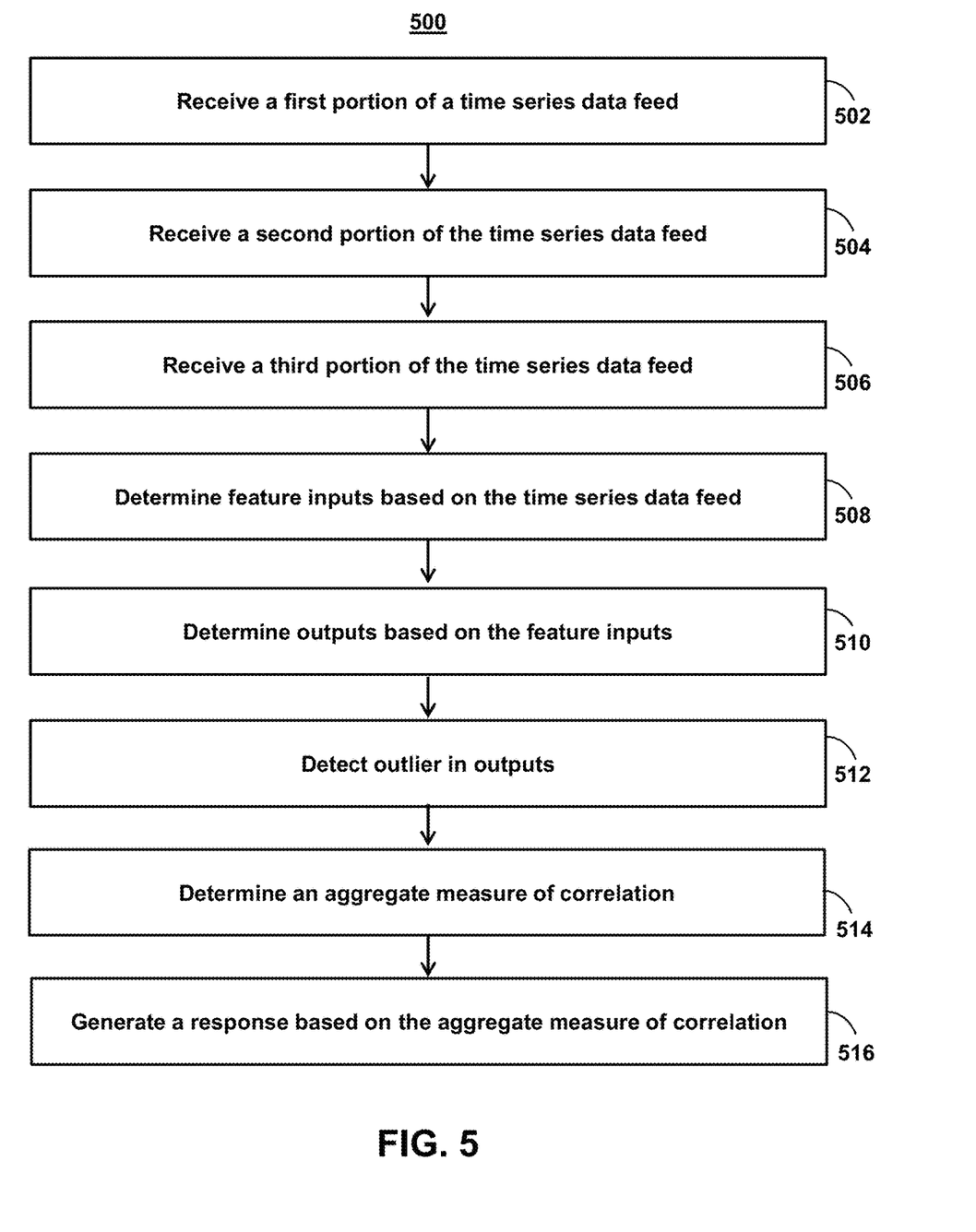
FIG. 5 shows a flowchart of the steps involved in generating dynamic database query responses using ensemble prediction by correlating probability models with non-homogeneous time dependencies to generate time-specific data processing predictions, in accordance with one or more embodiments.

FIG. 5 shows a flowchart of the steps involved in generating dynamic database query responses using ensemble prediction by correlating probability models with non-homogeneous time dependencies to generate time-specific data processing predictions, in accordance with one or more embodiments.

At step 502, process 500 (e.g., using one or more components in system 400 (FIG. 4)) receives a first portion of a time series data feed. For example, the system may receive a first portion of a time series data feed for a first machine learning model, wherein the first portion of the time series data feed comprises a first data processing load prediction based on a real-time average of data processing loads from a first plurality of data sources.

At step 504, process 500 (e.g., using one or more components in system 400 (FIG. 4)) receives a second portion of the time series data feed. For example, the system may receive a second portion of the time series data feed for a second machine learning model, wherein the second portion of the time series data feed comprises a second data processing load prediction based on a progressively calculated weighted average of data processing loads from a second plurality of data sources.

At step 506, process 500 (e.g., using one or more components in system 400 (FIG. 4)) receives a third portion of the time series data feed. For example, the system may receive a third portion of the time series data feed for a third machine learning model, wherein the third portion of the time series data feed comprises a third data processing load prediction based on a compounded average over a rolling time window of data processing loads from a third plurality of data sources.

At step 508, process 500 (e.g., using one or more components in system 400 (FIG. 4)) determines feature inputs based on the time series data feed. For example, the system may determine a first feature input for the first machine learning model based on the first portion, a second feature input for the second machine learning model based on the second portion, and a third feature input for the third machine learning model based on the third portion.

At step 510, process 500 (e.g., using one or more components in system 400 (FIG. 4)) determines outputs based on the feature inputs. For example, the system may input the first feature input into the first machine learning model, the second feature input into the second machine learning model, and the third feature input into the third machine learning model to generate a first output from the first machine learning model, a second output from the second machine learning model, and a third output from the third machine learning model. For example, the first output may be multi-label, wherein training data for the first machine learning model is multi-class. For example, the first machine learning model may be a single multi-class convolutional neural network, wherein the first output of the first machine learning model is a multi-value vector of probabilities, and wherein each value in the multi-value vector of probabilities corresponds to a given data processing load.

At step 512, process 500 (e.g., using one or more components in system 400 (FIG. 4)) detects outlier in outputs. For example, the system may compare the first output to the second output and the third output to detect an outlier result in the first output.

At step 514, process 500 (e.g., using one or more components in system 400 (FIG. 4)) determines an aggregate measure of correlation. For example, the system may in response to detecting the outlier result, input the first output, the second output, and the third output into a fourth machine learning model to generate a fourth output. The system may then determine, based on the fourth output, an aggregate measure of correlation for the first machine learning model, the second machine learning model, and the third machine learning model. In some embodiments, the aggregate measure of correlation for the first machine learning model, the second machine learning model, and the third machine learning model may be based on detecting a TPR.

At step 516, process 500 (e.g., using one or more components in system 400 (FIG. 4)) generates a response based on the aggregate measure of correlation. For example, the system may generate a dynamic database query response based on the aggregate measure of correlation. For example, the dynamic database query response comprises a recommendation for allocating network resources based on detected.

In some embodiments, the system may determine a recommendation (e.g., for populating in the response) based on whether or not the aggregate measure of correlation is above a threshold level. For example, the system may retrieve a threshold aggregate measure of correlation. The system may compare the threshold aggregate measure of correlation to the aggregate measure of correlation. In response to comparing the threshold aggregate measure of correlation to the aggregate measure of correlation, the system may determine that the aggregate measure of correlation does not correspond to the threshold aggregate measure of correlation. In response to determining that the aggregate measure of correlation does not correspond to the threshold aggregate measure of correlation, the system may generate a recommendation for the dynamic database query response based on the second output and third output. In contrast, in response to comparing the threshold aggregate measure of correlation to the aggregate measure of correlation, the system may determine that the aggregate measure of correlation does correspond to the threshold aggregate measure of correlation. The system may then, in response to determining that the aggregate measure of correlation does correspond to the threshold aggregate measure of correlation, generate a recommendation for the dynamic database query response based on the first output.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving a first portion of a time series data feed for a first machine learning model, wherein the first portion of the time series data feed comprises a first data processing load prediction based on a real-time average of data processing loads from a first plurality of data sources;

receiving a second portion of the time series data feed for a second machine learning model; receiving a third portion of the time series data feed for a third machine learning model; determining a first feature input for the first machine learning model based on the first portion, a second feature input for the second machine learning model based on the second portion, and a third feature input for the third machine learning model based on the third portion; inputting the first feature input into the first machine learning model, the second feature input into the second machine learning model, and the third feature input into the third machine learning model to generate a first output from the first machine learning model, a second output from the second machine learning model, and a third output from the third machine learning model; comparing the first output to the second output and the third output to detect an outlier result in the first output; in response to detecting the outlier result, inputting the first output, the second output, and the third output into a fourth machine learning model to generate a fourth output; determining, based on the fourth output, an aggregate measure of correlation for the first machine learning model, the second machine learning model, and the third machine learning model; and generating a dynamic database query response based on the aggregate measure of correlation.
2. The method of the preceding embodiment, wherein the method is for generating dynamic database query responses using ensemble prediction by correlating probability models with non-homogeneous time dependencies to generate time-specific data processing predictions.
3. The method of any one of the preceding embodiments, wherein the second portion of the time series data feed comprises a second data processing load prediction based on a progressively calculated weighted average of data processing loads from a second plurality of data sources.
4. The method of any one of the preceding embodiments, wherein the third portion of the time series data feed comprises a third data processing load prediction based on a compounded average over a rolling time window of data processing loads from a third plurality of data sources.
5. The method of any one of the preceding embodiments, wherein the aggregate measure of correlation for the first machine learning model, the second machine learning model, and the third machine learning model is based on detecting a True Positive Rate ("TPR").
6. The method of any one of the preceding embodiments, wherein the dynamic database query response comprises a recommendation for allocating network resources.
7. The method of any one of the preceding embodiments, further comprising: retrieving a threshold aggregate measure of correlation; comparing the threshold aggregate measure of correlation to the aggregate measure of correlation; in response to comparing the threshold aggregate measure of correlation to the aggregate measure of correlation, determining that the aggregate measure of correlation does not correspond to the threshold aggregate measure of correlation; and in response to determining that the aggregate measure of correlation does not correspond to the threshold aggregate measure of correlation, generating a recommen-dation for the dynamic database query response based on the second output and third output.
8. The method of any one of the preceding embodiments, further comprising: retrieving a threshold aggregate measure of correlation; comparing the threshold aggregate measure of correlation to the aggregate measure of correlation; in response to comparing the threshold aggregate measure of correlation to the aggregate measure of correlation, determining that the aggregate measure of correlation does correspond to the threshold aggregate measure of correlation; and in response to determining that the aggregate measure of correlation does correspond to the threshold aggregate measure of correlation, generating a recommendation for the dynamic database query response based on the first output.
9. The method of any one of the preceding embodiments, wherein the fourth machine learning model comprises an ensemble function that is trained on outputs of the first machine learning model, the second machine learning model, and the third machine learning model.
10. The method of any one of the preceding embodiments, wherein the first output is multi-label, and wherein a training data for the first machine learning model is multi-class.
11. The method of any one of the preceding embodiments, wherein the first machine learning model is a single multi-class convolutional neural network, wherein the first output of the first machine learning model is a multi-value vector of probabilities, and wherein each value in the multi-value vector of probabilities corresponds to a given data processing load.
12. A tangible, non-transitory, machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:
1. A system for generating dynamic database query responses using ensemble prediction by correlating probability models with non-homogeneous time dependencies to generate time-specific data processing predictions, the system comprising:
one or more processors; and
a non-transitory, computer-readable media comprising instructions that, when executed by the one or more processors, cause operations comprising:
receiving a first portion of a time series data feed for a first machine learning model, wherein the first portion of the time series data feed comprises a first data processing load prediction based on a real-time average of data processing loads from a first plurality of data sources;
receiving a second portion of the time series data feed for a second machine learning model, wherein the second portion of the time series data feed comprises a second data processing load prediction based on a progressively calculated weighted average of data processing loads from a second plurality of data sources;

receiving a third portion of the time series data feed for a third machine learning model, wherein the third portion of the time series data feed comprises a third data processing load prediction based on a compounded average over a rolling time window of data processing loads from a third plurality of data sources;

determining a first feature input for the first machine learning model based on the first portion of the time series data feed, a second feature input for the second machine learning model based on the second portion of the time series data feed, and a third feature input for the third machine learning model based on the third portion of the time series data feed;

inputting the first feature input into the first machine learning model, the second feature input into the second machine learning model, and the third feature input into the third machine learning model to generate a first output from the first machine learning model, a second output from the second machine learning model, and a third output from the third machine learning model;

comparing the first output to the second output and the third output to detect an outlier result in the first output;

in response to detecting the outlier result, inputting the first output, the second output, and the third output into a fourth machine learning model to generate a fourth output;

determining, based on the fourth output, an aggregate measure of correlation for the first machine learning model, the second machine learning model, and the third machine learning model; and generating a dynamic database query response based on the aggregate measure of correlation.

2. A method for generating dynamic database query responses using ensemble prediction by correlating probability models with non-homogeneous time dependencies to generate time-specific data processing predictions, the method comprising:

receiving a first portion of a time series data feed for a first machine learning model, wherein the first portion of the time series data feed comprises a first data processing load prediction based on a real-time average of data processing loads from a first plurality of data sources;

receiving a second portion of the time series data feed for a second machine learning model;

receiving a third portion of the time series data feed for a third machine learning model;

determining a first feature input for the first machine learning model based on the first portion of the time series data feed, a second feature input for the second machine learning model based on the second portion of the time series data feed, and a third feature input for the third machine learning model based on the third portion of the time series data feed;

inputting the first feature input into the first machine learning model, the second feature input into the second machine learning model, and the third feature input into the third machine learning model to generate a first output from the first machine learning model, a second output from the second machine learning model, and a third output from the third machine learning model;

comparing the first output to the second output and the third output to detect an outlier result in the first output;

in response to detecting the outlier result, inputting the first output, the second output, and the third output into a fourth machine learning model to generate a fourth output;

determining, based on the fourth output, an aggregate measure of correlation for the first machine learning model, the second machine learning model, and the third machine learning model; and generating a dynamic database query response based on the aggregate measure of correlation.

3. The method of claim 2, wherein the second portion of the time series data feed comprises a second data processing load prediction based on a progressively calculated weighted average of data processing loads from a second plurality of data sources.

4. The method of claim 2, wherein the third portion of the time series data feed comprises a third data processing load prediction based on a compounded average over a rolling time window of data processing loads from a third plurality of data sources.

5. The method of claim 2, wherein the aggregate measure of correlation for the first machine learning model, the second machine learning model, and the third machine learning model is based on detecting a True Positive Rate (TPR).

6. The method of claim 2, wherein the dynamic database query response comprises a recommendation for allocating network resources.

7. The method of claim 2, further comprising:
retrieving a threshold aggregate measure of correlation;
comparing the threshold aggregate measure of correlation to the aggregate measure of correlation;
in response to comparing the threshold aggregate measure of correlation to the aggregate measure of correlation, determining that the aggregate measure of correlation does not correspond to the threshold aggregate measure of correlation; and
in response to determining that the aggregate measure of correlation does not correspond to the threshold aggregate measure of correlation, generating a recommendation for the dynamic database query response based on the second output and third output.

8. The method of claim 2, further comprising:
retrieving a threshold aggregate measure of correlation;
comparing the threshold aggregate measure of correlation to the aggregate measure of correlation;
in response to comparing the threshold aggregate measure of correlation to the aggregate measure of correlation, determining that the aggregate measure of correlation does correspond to the threshold aggregate measure of correlation; and
in response to determining that the aggregate measure of correlation does correspond to the threshold aggregate measure of correlation, generating a recommendation for the dynamic database query response based on the first output.

9. The method of claim 2, wherein the fourth machine learning model comprises an ensemble function that is trained on outputs of the first machine learning model, the second machine learning model, and the third machine learning model.

10. The method of claim 2, wherein the first output is multi-label, and wherein training data for the first machine learning model is multi-class.

11. The method of claim 2, wherein the first machine learning model is a single multi-class convolutional neural network, wherein the first output of the first machine learning model is a multi-value vector of probabilities, and wherein each value in the multi-value vector of probabilities corresponds to a given data processing load.

12. A non-transitory, computer-readable media comprising of instructions that, when executed by one or more processors, cause operations comprising:
- receiving a first portion of a time series data feed for a first machine learning model, wherein the first portion of the time series data feed comprises a first data processing load prediction based on a real-time average of data processing loads from a first plurality of data sources;
- receiving a second portion of the time series data feed for a second machine learning model;
- receiving a third portion of the time series data feed for a third machine learning model;
- determining a first feature input for the first machine learning model based on the first portion of the time series data feed, a second feature input for the second machine learning model based on the second portion of the time series data feed, and a third feature input for the third machine learning model based on the third portion of the time series data feed;
- inputting the first feature input into the first machine learning model, the second feature input into the second machine learning model, and the third feature input into the third machine learning model to generate a first output from the first machine learning model, a second output from the second machine learning model, and a third output from the third machine learning model;
- comparing the first output to the second output and the third output to detect an outlier result in the first output;
- in response to detecting the outlier result, inputting the first output, the second output, and the third output into a fourth machine learning model to generate a fourth output;
- determining, based on the fourth output, an aggregate measure of correlation for the first machine learning model, the second machine learning model, and the third machine learning model; and
- generating a dynamic database query response based on the aggregate measure of correlation.

13. The non-transitory, computer-readable media of claim 12, wherein the second portion of the time series data feed comprises a second data processing load prediction based on a progressively calculated weighted average of data processing loads from a second plurality of data sources.

14. The non-transitory, computer-readable media of claim 12, wherein the third portion of the time series data feed comprises a third data processing load prediction based on a compounded average over a rolling time window of data processing loads from a third plurality of data sources.

15. The non-transitory, computer-readable media of claim 12, wherein the aggregate measure of correlation for the first machine learning model, the second machine learning model, and the third machine learning model is based on detecting a True Positive Rate (TPR).

16. The non-transitory, computer-readable media of claim 12, wherein the dynamic database query response comprises a recommendation for allocating network resources.

17. The non-transitory, computer-readable media of claim 12, further comprising:
- retrieving a threshold aggregate measure of correlation;
- comparing the threshold aggregate measure of correlation to the aggregate measure of correlation;
- in response to comparing the threshold aggregate measure of correlation to the aggregate measure of correlation, determining that the aggregate measure of correlation does not correspond to the threshold aggregate measure of correlation; and
- in response to determining that the aggregate measure of correlation does not correspond to the threshold aggregate measure of correlation, generating a recommendation for the dynamic database query response based on the second output and third output.

18. The non-transitory, computer-readable media of claim 12, further comprising:
- retrieving a threshold aggregate measure of correlation;
- comparing the threshold aggregate measure of correlation to the aggregate measure of correlation;
- in response to comparing the threshold aggregate measure of correlation to the aggregate measure of correlation, determining that the aggregate measure of correlation does correspond to the threshold aggregate measure of correlation; and
- in response to determining that the aggregate measure of correlation does correspond to the threshold aggregate measure of correlation, generating a recommendation for the dynamic database query response based on the first output.

19. The non-transitory, computer-readable media of claim 12, wherein the fourth machine learning model comprises an ensemble function that is trained on outputs of the first machine learning model, the second machine learning model, and the third machine learning model.

20. The non-transitory, computer-readable media of claim 12, wherein the first output is multi-label, and wherein a training data for the first machine learning model is multi-class.

* * * * *